United States Patent [19]

Kelleher et al.

[11] Patent Number: 4,948,652
[45] Date of Patent: Aug. 14, 1990

[54] ELASTOMERIC COMPOSITE MEMBRANE

[76] Inventors: Denis M. Kelleher, 3981 S. Benton Way, Denver, Colo. 80235; Robert B. Walters, 20456 Flint La., Morrison, Colo. 80465

[21] Appl. No.: 418,038

[22] Filed: Oct. 6, 1989

[51] Int. Cl.$^5$ ............................................. B32B 25/04
[52] U.S. Cl. ...................................... 422/110; 428/141; 428/142; 428/247; 428/284; 428/287; 428/332; 428/492; 428/495
[58] Field of Search ............... 428/141, 142, 110, 247, 428/284, 287, 492, 493, 494, 495, 332

[56] References Cited

U.S. PATENT DOCUMENTS

| | | | |
|---|---|---|---|
| 4,233,356 | 11/1980 | Jacobs | 428/247 |
| 4,420,524 | 12/1983 | Gorgati | 428/141 |
| 4,442,167 | 4/1984 | Iwasa et al. | 428/495 |
| 4,461,875 | 7/1984 | Crepean | 428/141 |
| 4,514,442 | 4/1985 | Crepean | 428/142 |
| 4,551,392 | 11/1985 | Draexler | 428/495 |

Primary Examiner—James J. Bell

[57] ABSTRACT

An elastomeric composite membrane for use in construction installations wherein the membrane is in contact with an asphaltic component. The membrane comprises upper and lower sheets bonded together. The upper exposed sheet is resistant to weathering such as to moisture and ultraviolet rays, and in some cases to corrosive chemicals as well, while the lower sheet is compatible with asphalt. Preferably, the lower sheet is comprised of nitrile rubber, and the upper sheet is comprised of a rubber compound such as EPDM.

14 Claims, 1 Drawing Sheet

U.S. Patent   Aug. 14, 1990   4,948,652
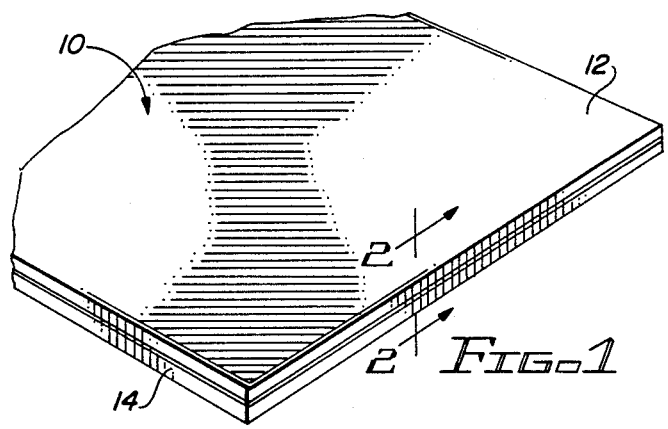
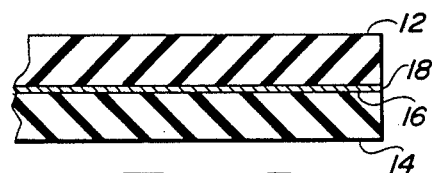
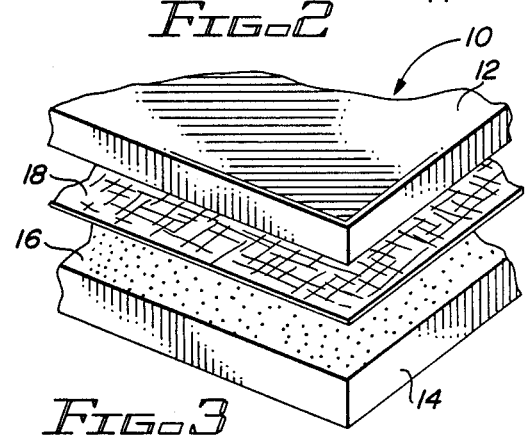
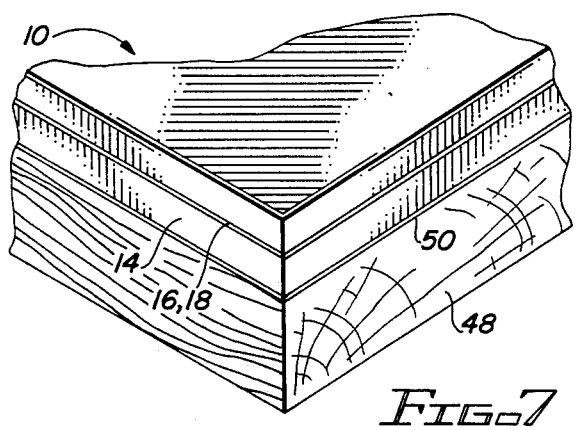
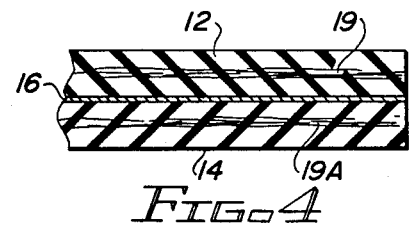
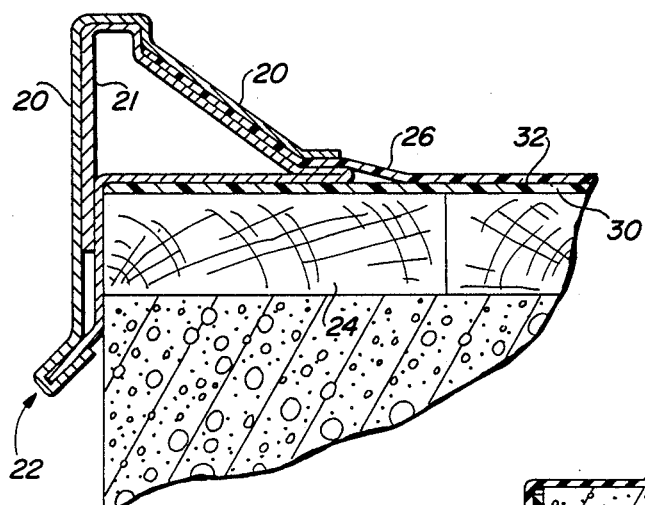
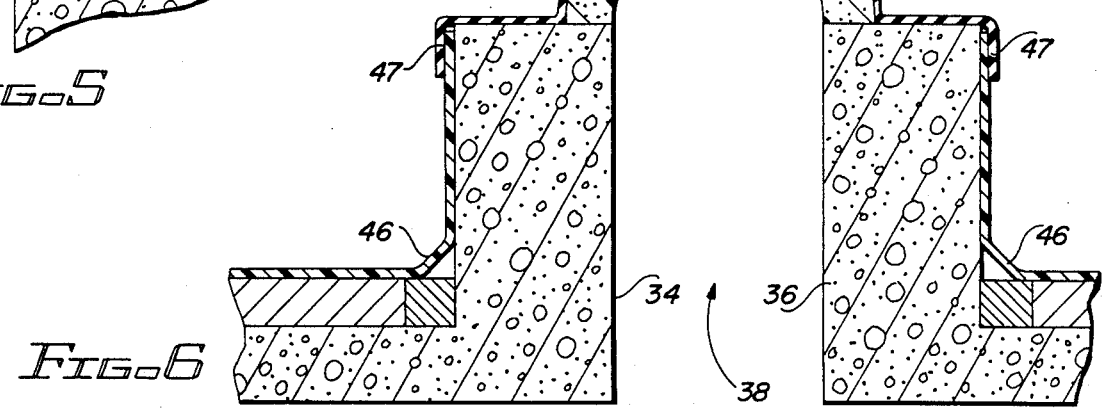

ELASTOMERIC COMPOSITE MEMBRANE

FIELD OF THE INVENTION

This invention relates to a composite membrane. More particularly, it relates to a composite membrane especially adapted for use in various types of constructions where it is exposed to the weather or other corrosive forces and is also in contact with asphalt or asphaltic components.

BACKGROUND OF THE INVENTION

In commercial and industrial construction practices it is common to employ weather and/or chemical resistant elastomeric membranes in such environments as roofing, concrete tank lining, outdoor waterproofing, flashing and expansion joint applications. In roof construction the roof membrane is often of the typical built-up roof type, comprising a number of layers of asphalt impregnated or coated mats bonded together by hot asphalt mopping. In waterproofing applications the substrates are often primed with an asphalt based primer and one or more coatings of asphalt may also be applied. This requires the membrane to be compatible with asphalt. If it is not, premature aging and deterioration of the membrane material may occur, and the membrane will most likely require replacing prior to its design life. Nitrile rubber is an example of a membrane material which is compatible with asphalt and with materials containing asphalt such as asphaltic adhesive. Nitrile rubber is not, however, well suited to function as a waterproofing flashing or roofing membrane which is exposed to sunlight due to its poor resistance to ultraviolet rays, which cause early deterioration of the material.

Other elastomeric materials which have a higher resistance to ultraviolet rays are not as compatible with asphalt and preferably should not be used as a weather resistant membrane. This situation has led to the use of composite membranes comprised of a sheet of nitrile rubber over which a thin fluorocarbon film, such as material marketed under the name Tedlar, is laminated. While this arrangement protects the nitrile rubber sheet from the effects of ultraviolet light, the thin fluorcarbon film, which typically is only about one and a half mils thick, is very expensive and is subject to damage in the normal handling and application of the composite membrane. It is not practical to make the membrane more durable by increasing the thickness of the fluorocarbon film because of the high cost of the fluorocarbon material.

It is therefore an object of the invention to provide a weather resistant elastomeric membrane which is not only compatible with asphalt and asphaltic materials and is resistant to the effects of ultraviolet rays, but is also relatively inexpensive and able to resist the stresses of shipping, handling and service.

BRIEF SUMMARY OF THE INVENTION

In accordance with the invention, an elastomeric composite membrane is provided which comprises a first reinforced or nonreinforced elastomeric sheet, preferably formed from a compound which is resistant to moisture and ultraviolet rays. The first elastomeric sheet is bonded to a second elastomeric sheet to form a laminate, the second elastomeric sheet comprising a compound compatible with asphalt and with asphaltic adhesives. The first elastomeric sheet is exposed to the weather while the second elastomeric sheet is in contact with the asphaltic components of the substrate. Because the sheets are relatively tough and thick, having a composite thickness in the range of 20 to 80 mils, both sheets of the composite membrane are able to resist the stresses to which they are exposed during normal handling, shipping, application and service.

Preferably, for most roofing and waterproofing applications, the lower sheet of the laminate is comprised of an asphalt compatible material such as nitrile rubber, while the upper sheet is comprised of a weather resistant compound such as ethylene-propylene-diene-monomer (EPDM). The resulting composite membrane not only functions in the manner desired, but its cost is relatively low. For acid, alkaline or hydrocarbon applications the upper sheet would preferably be comprised of a reinforced or nonreinforced elastomeric sheet that is resistant to the specific medium or substance to which it is being exposed.

These and other aspects of the invention, as well as other benefits, will readily be ascertained from the more detailed description of the preferred embodiment of the invention which follows.

BRIEF DESCRIPTION OF THE DRAWINGS

FIG. 1 is a partial pictorial view of the membrane of the invention;

FIG. 2 is an enlarged partial sectional view of the membrane taken along line 2—2 of FIG. 1;

FIG. 3 is an enlarged exploded partial pictorial view of the components of another embodiment of the membrane;

FIG. 4 is an enlarged partial sectional view of a modified form of the exterior sheet of the composite membrane;

FIG. 5 is a transverse sectional view of the membrane of the invention utilized as a roof edge flashing;

FIG. 6 is a transverse sectional view of the membrane of the invention utilized as a flashing in connection with an expansion joint cover; and FIG. 7 is an enlarged partial pictorial view of the membrane of the invention functioning as a roof membrane.

DESCRIPTION OF THE PREFERRED EMBODIMENT

Referring to FIGS. 1 and 2, the composite membrane 10 of the preferred embodiment is comprised of an upper sheet 12 bonded to a lower sheet 14 by suitable adhesive 16. The upper sheet 12 is an elastomeric sheet formed from a compound which is resistant to the weather or, if necessary, to chemical attack. Preferably, in addition to being resistant to moisture and ultraviolet light, the material is also resistant to ozone, oxygen, heat, hydrocarbons, acids, alkalines and other chemicals and weathering factors to which the membrane may be exposed. Any compound exhibiting these characteristics may be used, provided it can be formed into a sheet thick enough to resist the physical stresses to which it is exposed without being unduly damaged. This is an important feature in order to protect the lower sheet 14 from the effects of weathering or chemical attack. EPDM is the preferred material for the sheet 12 for most roofing and waterproofing applications since it can readily be formed into sheets of sufficient thickness to resist physical stresses while protecting the lower sheet 14 against the weather and some chemicals. Other materials which can be used to form the sheet include chlorinated polyethylene to provide resistance to hydrocarbons, polyvinyl chloride to provide acid resistance, or neoprene to provide greater oil resistance. A typical thickness for the upper sheet 12 in a commercial embodiment of the invention is in the order of 10 or more mils. It is contemplated, however, that the thickness of the sheet 12 may vary from about 10 to 40 mils. At thicknesses less than the minimum level it would be questionable whether the sheet 12 would still be capable of providing the weathering protection and physical resistance required of it, while at thicknesses greater than the maximum the composite membrane would tend to be too unwieldy and inflexible and the cost would tend to be too high to be economically attractive. Both cured and uncured forms of the sheet may be utilized, the uncured forms enabling the sheet to be more readily shaped around corners and to retain that shape when cured in place.

The lower sheet 14 may be formed of any elastomeric compound which is capable of resisting the levels of physical stress to which it would be exposed and which is compatible with asphalt or asphaltic materials. The preferred material is nitrile rubber which is compatible with asphalt, thereby making it resistant to degradation or damage caused by contact with asphalt. This material is tough enough to resist the stresses of service and installation and is sufficiently economical to allow it to be used in the thicknesses necessary to permit proper functioning. A typical thickness for this sheet is in the order of 10 or more mils, the same as a typical thickness for the sheet 12. The preferred thickness for the sheet 14 is in the range of 10 to 40 mils. The composite membrane would tend to be too flimsy and not tough enough if the thickness of the lower sheet 14 were less than the preferred minimum figure and too inflexible, unwieldy and expensive if the thickness were greater than the preferred maximum figure.

Since each of the sheets of the composite membrane is flexible, tough and elastomeric, the composite membrane is capable of expanding and contracting as necessary in response to stresses from temperature changes and building movement.

As shown in FIG. 3, the adhesive layer 16 may be further reinforced with reinforcing material such as a fiber glass scrim 18, which is very thin and lightweight, but has good tensile strength and imparts additional strength to the bond. Other materials may be used to reinforce the adhesive bond, such as a synthetic fiber mat, an example of which is a polyester fiber mat. In any event, the reinforcement material preferably is fibrous in nature for the tensile strength it contributes, and because it is lightweight, thin, strong, easy to handle and inexpensive. One or both of the individual sheets 12 and 14 may also be reinforced, if additional strength is required, by utilizing a reinforcing layer within the sheets. Fibrous mats 19 and 19A are shown as such reinforcing layers in FIG. 4.

Although the bond between the sheets has been described as an adhesive bond caused by a layer of adhesive applied to the sheets, it should be understood that other bonding methods may be employed, such as by vulcanizing the sheets together or through the use of chemical or mechanical bonds.

Referring to FIG. 5, the composite membrane of the invention is illustrated as being in the form of a roof edge flashing. A water dam 21, having a leg extending down over the roof edge, and fascia 20 are clipped or snapped together as at 22 and are attached to a roof in the usual manner through wood nailers 24, with the flashing 26 being held in place between the dam 21 and the inner leg of the fascia strip 20. The flashing 26 extends a distance toward the interior of the roof away from the dam and terminates at that point. The main roof membrane is shown as a typical built-up roof membrane comprised of a plurality of layers of asphalt coated fibrous mat 30. The flashing is adhered to the built-up roof membrane by suitable asphaltic adhesive or cement 32. Thus the flashing is in contact with the asphalt coated roof membrane as well as with an asphaltic roofing adhesive. The nitrile rubber compound of the lower sheet of the composite flashing 26, being compatible with asphalt, permits such contact and prevents contact of the asphalt material with the upper sheet of the flashing. The upper sheet of the flashing protects the lower sheet from the effects of weathering to prolong the life of the roof structure.

Another example of a roof installation incorporating the composite membrane of the invention is shown in FIG. 6, wherein adjacent roof elements 34 and 36 are spaced apart to form an expansion joint 38. The expansion joint cover 40 comprises the usual bellows 42 and a layer of flashing material 44 covering the bellows. The flashing 44, which is comprised of the composite membrane of the invention, is adhesively bonded to the bellows and to the built-up roof membrane 46. The adhesive connection 47 to the built-up roof membrane is similar to that of the flashing described in connection with FIG. 5.

In addition to functioning as a flashing material, the membrane of the invention may also be used as a roofing membrane. This is illustrated in FIG. 7, which shows a roof deck 48 and the composite membrane 10 of the invention. As illustrated, the lower nitrile rubber sheet 14 is adhered to the roof deck 48 by means of a layer of asphaltic cement 50, while the upper membrane 12 functions as the weather resistant layer. Additional uses in other installations where the exposed surface must be resistant to the weather and other corrosive forces and where the lower surface is in contact with asphalt or asphaltic components will readily come to mind to those skilled in the art.

It should now be appreciated that the composite membrane of the invention provides a practical inexpensive way of providing a weather and chemical resistant function while at the same time being compatible with asphalt or asphaltic elements of the associated substrate. There is no restriction on the various uses to which the membrane may be put, but it is anticipated that it would be used primarily as a flashing, roofing or waterproofing membrane material under conditions where the material must provide protection from the weather as well as be compatible with asphaltic elements which the lower side of the membrane may contact.

It should also be apparent that the invention is not necessarily limited to all the specific details described in connection with the preferred embodiment, but that changes to features of the preferred embodiment which do not alter the overall basic function and concept of the invention may be made by those skilled in the art without departing from the spirit and scope of the invention, as defined in the appended claims.

What is claimed is:

1. An elastomeric composite membrane, comprising:

a first elastomeric sheet comprised of a compound which is resistant to weathering;

a second elastomeric sheet comprising a compound compatible with asphalt and with asphaltic adhesives;

the first and second sheets being bonded together to form a laminate; and each of the first and second sheets having a thickness in the range of 10 to 40 mils.

2. The membrane of claim 1, wherein the first elastomeric sheet is resistant to one or more of moisture, ultraviolet rays, acids, alkalines and hydrocarbons.

3. The membrane of claim 1, wherein the second sheet comprises nitrile rubber.

4. The membrane of claim 3, wherein the first sheet comprises EPDM.

5. The membrane of claim 4, wherein the sheets are bonded by adhesive.

6. The membrane of claim 4, wherein the sheets are bonded by being vulcanized together.

7. The membrane of claim 6, wherein the bond between the sheets includes fibrous reinforcement.

8. The membrane of claim 7, wherein the fibrous reinforcement comprises a fiber glass scrim.

9. The membrane of claim 7, wherein the fibrous reinforcement comprises a polyester mat.

10. The membrane of claim 1, wherein the first elastomeric sheet includes a reinforcing layer intermediate the thickness thereof.

11. In a construction installation incorporating an asphaltic component:

an elastomeric composite membrane;

the membrane comprising an upper exposed elastomeric sheet comprised of a compound resistant to weathering;

the membrane also comprising a lower elastomeric sheet comprised of a compound compatible with asphalt and with asphaltic adhesives;

each of the upper and lower sheets having a thickness in the range of 10 to 40 mils;

the upper and lower sheets being bonded together to form a laminate; and the lower sheet of the laminate being in contact with the asphaltic component.

12. The membrane of claim 11, wherein the lower sheet comprises nitrile rubber.

13. The membrane of claim 12, wherein the asphaltic component is an asphaltic adhesive bonding the membrane to a portion of the construction installation.

14. The membrane of claim 12, wherein the asphaltic component is an asphaltic built-up roof membrane.

* * * * *